United States Patent [19]

Van Pelt et al.

[11] Patent Number: 4,470,082

[45] Date of Patent: Sep. 4, 1984

[54] DIGITAL CLOCKING AND DETECTION SYSTEM FOR A DIGITAL STORAGE SYSTEM

[75] Inventors: Richard W. Van Pelt, Boulder; Donald F. McCarthy, Jefferson County, both of Colo.

[73] Assignee: Storage Technology Corporation, Louisville, Colo.

[21] Appl. No.: 395,605

[22] Filed: Jul. 6, 1982

[51] Int. Cl.³ .......................... G11B 5/09; H03L 7/10
[52] U.S. Cl. ........................................ 360/51; 331/25
[58] Field of Search ............... 360/51, 29, 39; 331/14, 331/17, 25, 29, 39

[56] References Cited

U.S. PATENT DOCUMENTS

| 4,109,236 | 8/1978 | Besenfelder et al. | 340/146.1 |
|---|---|---|---|
| 4,357,707 | 11/1982 | Delury | 360/51 |
| 4,385,396 | 5/1983 | Norton | 360/51 |

OTHER PUBLICATIONS

"Digital Phase Error Detector", L. Taber, IBM Technical Disclosure Bulletin, vol. 23, No. 11, Apr. 1981.

Primary Examiner—Vincent P. Canney
Attorney, Agent, or Firm—Woodcock, Washburn, Kurtz, Mackiewicz & Norris

[57] ABSTRACT

A data clocking and detection system for a digital data storage system includes a common controlled oscillator for the multiple tracks. A phase detector for each track includes a counter and decoding circuitry producing outputs representing the time occurrence of transitions in the data with respect to bit cells defined by multiple clock pulses for each bit cell. Phase errors are used to control the frequency of the VCO, and large phase errors are used to add or subtract a count from the phase counter in each phase detector.

15 Claims, 19 Drawing Figures

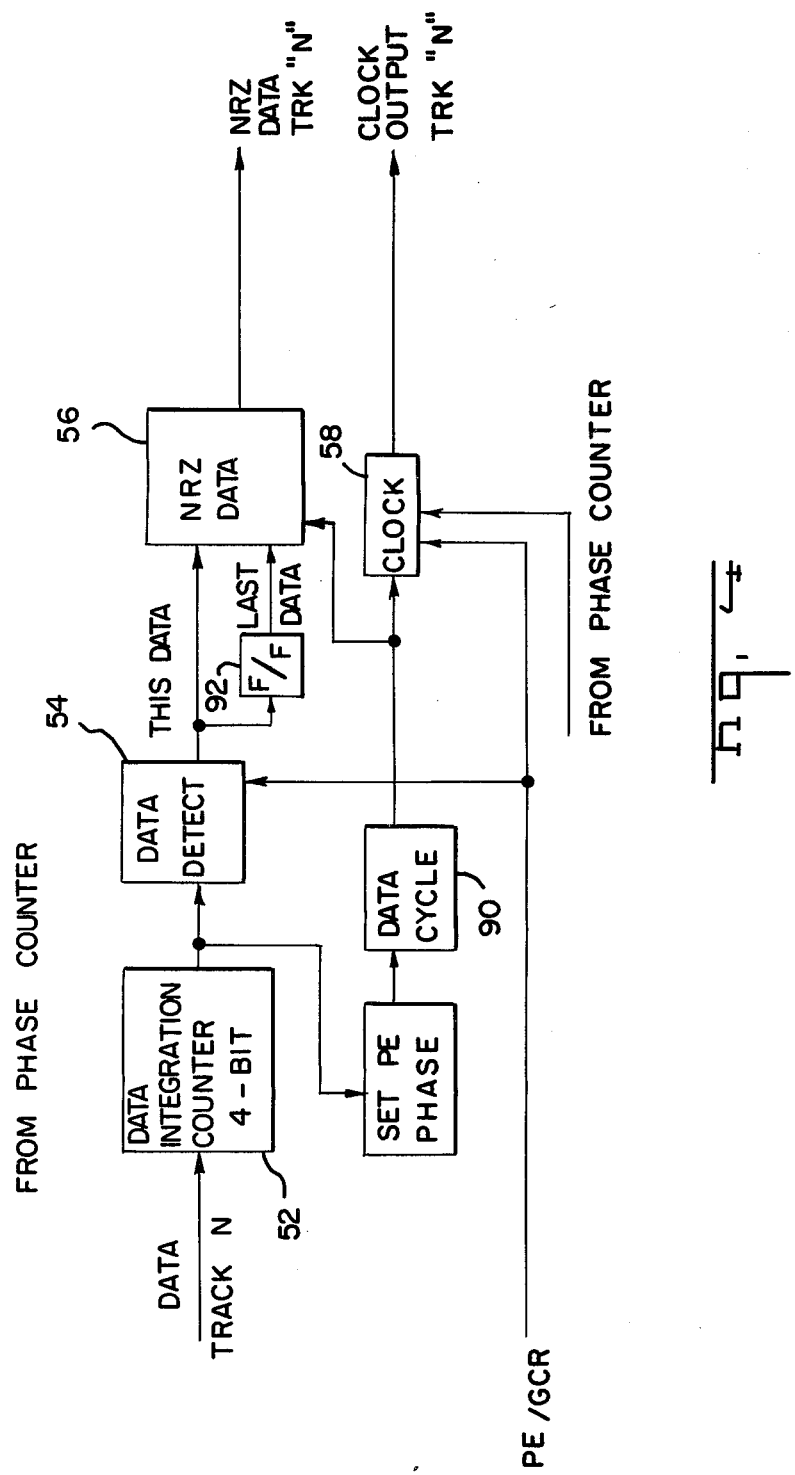

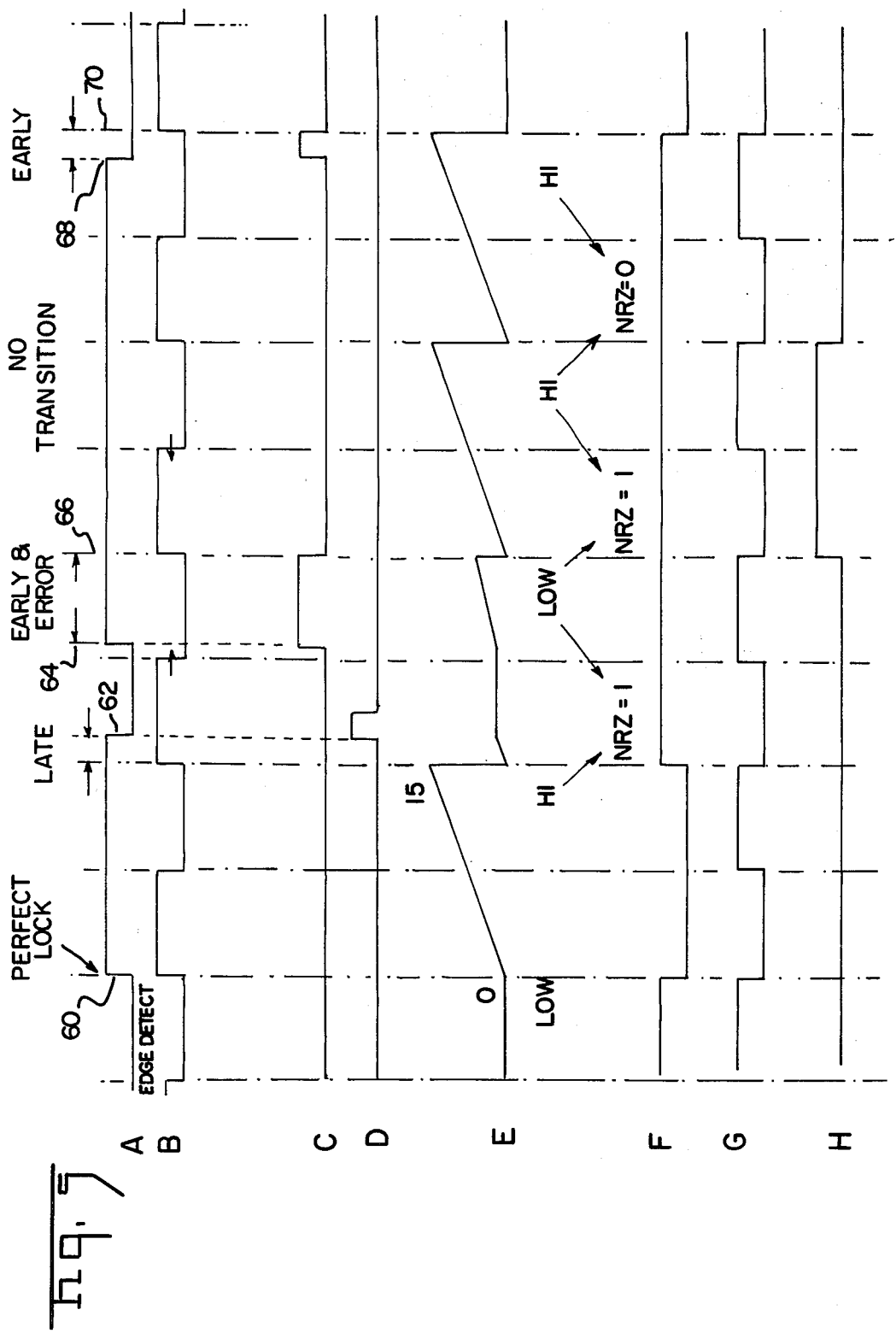

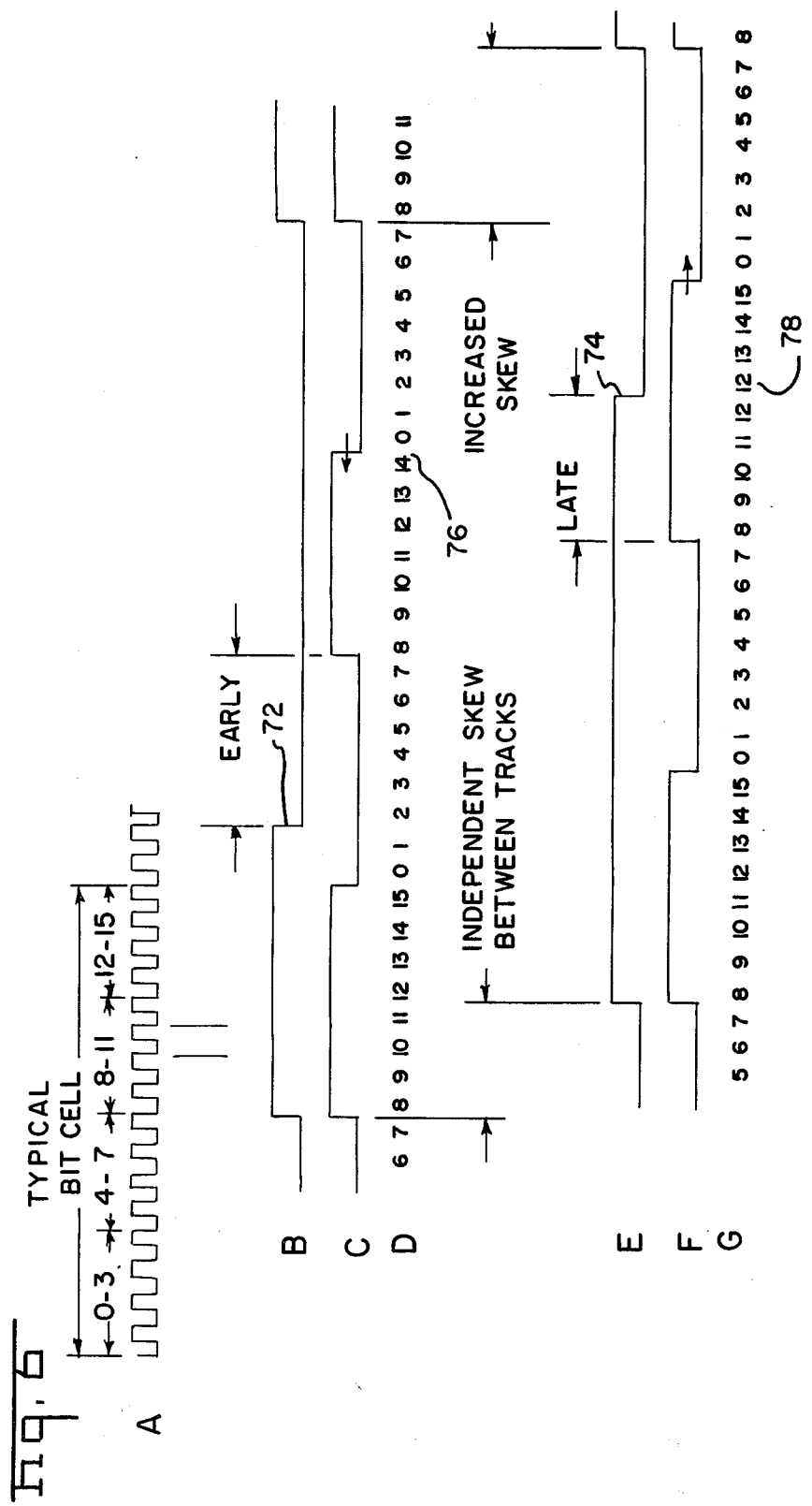

DIGITAL CLOCKING AND DETECTION SYSTEM FOR A DIGITAL STORAGE SYSTEM

BACKGROUND OF THE INVENTION

This invention relates to data clocking and detection for digital data storage systems such as tape drives and more particularly, to an improved digital data clocking and detection system.

When stored digital data is played back from a data storage system, such as a magnetic tape or disk system, it is necessary to determine both the frequency and the phase of the transitions in the played back signals. In magnetic tape storage the data is typically stored in nine tracks which contain transitions representing ones and zeroes making up digital data words. A separate clock track is not normally recorded. From the played back data itself, the proper clocking must be determined in order to define the limits of the bit cells in each track.

Since the speed of the magnetic medium upon which the data is recorded may vary slightly, the frequency of the clock pulses defining the edges of the bit cells which are read from the medium must be varied to match these changes in speed. It is common practice to provide a voltage controlled oscillator (V.C.O.) which tracks the detected transitions in order to provide clock pulses having a frequency which varies as the velocity of the magnetic medium changes. Providing proper clocking by itself is not sufficient; the phase of the detected transitions with respect to the clock pulses must also be detected. The two types of commonly used magnetic tape recording systems are ANSI Standard phase encoded (PE) and ANSI Standard GCR recording. In PE recording there is always a transition in the middle of a bit cell and sometimes there is a transition at the edge of a bit cell. In GCR recording, if a bit cell has a transition it is in the middle, not at the edge of the bit cell. Not all GCR bit cells have transitions. In order to properly determine whether the recorded bit is a one or zero, it is necessary for the data detection circuitry to have phase information which defines whether or not a transition occurs in a given bit cell.

Most prior art PE and GCR tape subsystems have used analog phase locked loops and analog data detection circuits for each track. U.S. Pat. No. 4,109,236-Besenfelder shows a digital circuit for clocking and detection. IBM Technical Disclosure Bulletin entitled "DIGITAL PHASE ERROR DETECTOR" by L. Taber, Vol. 23, No. 11, April, 1981 shows a digital phase detector.

In the prior art a phase locked loop and associated circuitry are provided for each data track. This is expensive because it requires a controlled oscillator for each track. There is another problem associated with this approach which is particularly prevalent in high density recording such as is currently practiced with GCR. In such recording a string of bit cells frequently occurs with no transitions. Because of the high density, and the nature of the medium, the transitions at the edge of this string are often shifted so that the transitions appear as a phase error. This incorrectly shifts the frequency of the controlled oscillator in an attempt to compensate for the apparent phase error in this track.

It is an object of the present invention to provide a digital data clocking and detection system in which a common controlled oscillator is used to provide the clock pulses for all tracks thereby effecting a cost reduction.

It is also an object of this invention to provide a digital data clocking detection system which reduces the sensitivity to the high density packing problem described above.

It is also an object of the present invention to provide digital data and phase detection circuitry which replaces the analog circuitry normally associated with these functions.

It is an object of the present invention to compensate for large errors in phase by changing the count in the phase counter associated with the track, whereas smaller phase errors are compensated by controlling the frequency of the controlled oscillator. In this manner, phase deviations, such as caused by skew, are compensated for in each individual track.

It is an object of the present invention to provide data and phase detecting circuitry in which dropout recovery is enhanced.

SUMMARY OF THE INVENTION

In accordance with the present invention, a data clocking and detection system for a digital data storage system includes a common controlled oscillator producing the clock pulses applied to the phase detectors for all of the multiple tracks. The phase detector for each track includes a binary counter which counts multiple, 16 nominally in the example, clock pulses for each bit cell. The phase error of the transition in the played back data is determined with respect to the count in the counter. If the transition occurs in a range of counts just prior to or just after the center of the bit cell, counts 4-7 and 8-11 in the example, a correction output representing the magnitude of the phase error is applied to the common controlled oscillator.

If the magnitude is greater, falling in the ranges of counts 0-3 and 11-15 in the example, a correction is applied to the oscillator as described above and, in addition, a phase correction is made by changing the count in the digital counter. For example, when the data transition falls in the count range 0-3, a count is subtracted from the counter and if it occurs in the range of 11-15 a count is added to the counter. In this way, the counters for the various tracks are adjusted differently, one with respect to the other in order to accommodate skew between the tracks.

In accordance with another aspect of the invention, the correction output which is applied to control the common controlled oscillator has a pulse width proportional to the magnitude of the phase error. Alternatively, the correction signal may be a fixed width pulse indicating only the polarity of the phase error. In either case, the correction information from all tracks are combined and applied to correct the oscillator.

In accordance with the invention the controlled oscillator circuitry provided for each track in the prior art is replaced by a single oscillator. This effects a cost savings and it also reduces the problem of erroneous correction of the controlled oscillator (VCO) caused by bit crowding. By separately correcting the individual counters in each phase detector, and commonly correcting the VCO, the data clocking and detection system of the present invention provides good tracking of transient variations in data frequency (media velocity) and also provides good tracking of longer term phase changes, such as caused by tape and head skew.

The foregoing and other objects, features and advantages of the invention will be better understood from the following more detailed description and appended claims.

SHORT DESCRIPTION OF THE DRAWINGS

FIG. 3 depicts the phase detector of the present invention;

FIG. 4 depicts the data detector of the present invention;

FIG. 5A-5H and 6A-6G show wave forms and more particularly:

FIG. 5A depicts the GCR data;

FIG. 5B is the most significant bit of the phase counter;

FIG. 5C shows the correction up signal;

FIG. 5D shows the correction down signal;

FIG. 5E shows the output of the data integration counter;

FIG. 5F shows the NRZ data for one track;

FIG. 5G shows the clock which is synchronized with the data;

FIG. 5H shows a phase error pointer;

FIG. 6A shows the clock output of the VCO;

FIG. 6B shows GCR data for one track;

FIG. 6C shows the most significant bit of the phase counter for that track;

FIG. 6D depicts the phase count for that track;

FIG. 6E depicts GCR data for another track;

FIG. 6F shows the most significant bit of the phase counter for the other track; and FIG. 6G depicts the phase count for the other track.

DESCRIPTION OF THE PREFERRED EMBODIMENT

Figure 1:
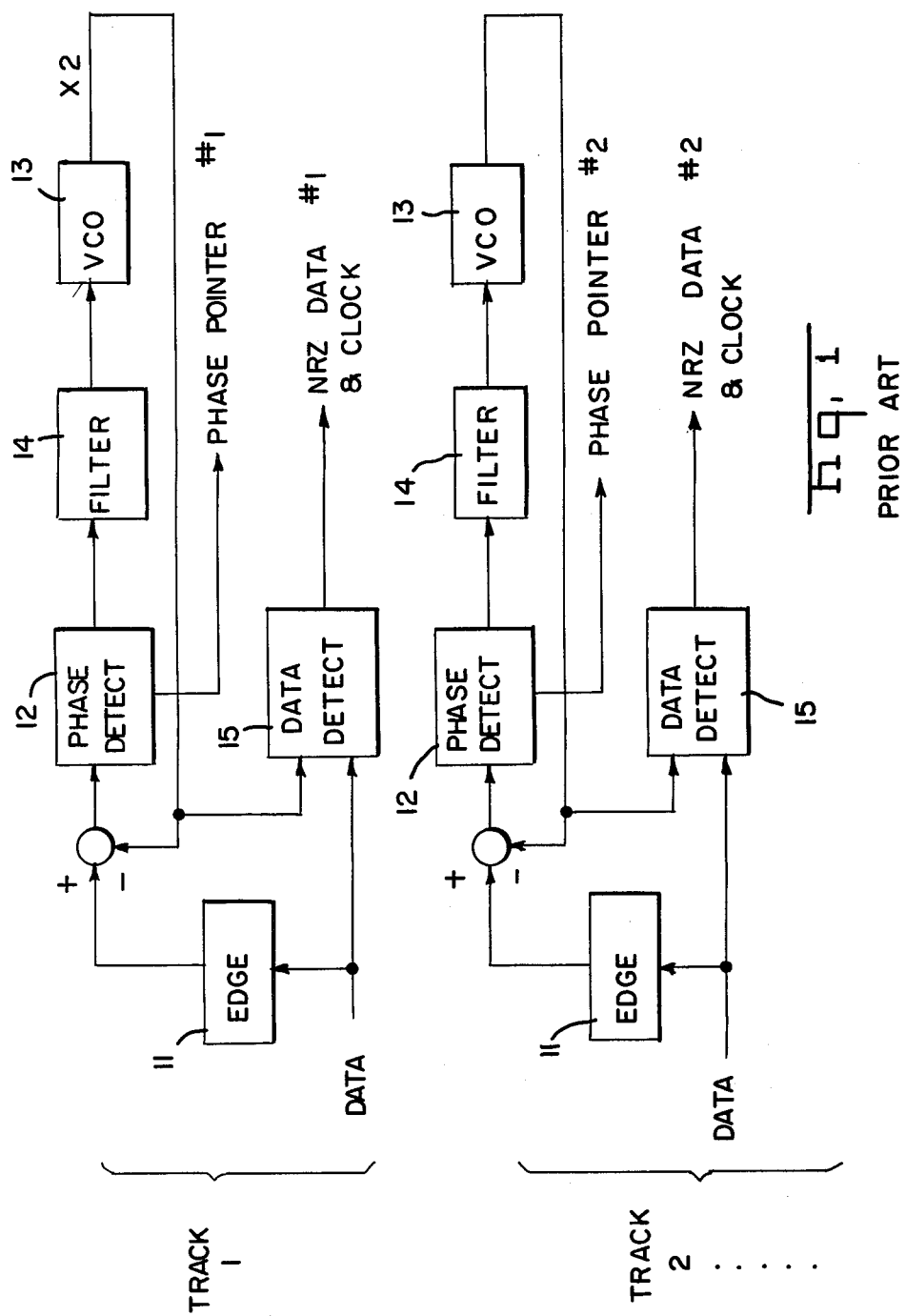
FIG. 1 depicts the prior art use of a separate VCO for each track of the storage system.

FIG. 1 shows the prior art data clocking and detection systems for detecting data played from a plurality of tracks, two tracks being shown in FIG. 1. Typically, magnetic tape drive systems record data in nine tracks in a PE or GCR format. Transitions in the played back data are detected by edge detectors 11. Phase detectors 12 detect the phase of the transitions with respect to clock pulses which define the bit cells in which the transitions occur. A controlled oscillator (VCO) 13 produces these clock pulses. The outputs of the phase detectors 12 are applied to filters 14 which produce a voltage which controls oscillators 13. The clock pulses are used in the detection of data by data detectors 15 which produce a nonreturn to zero output together with a clock which defines the bit cells of the data.

Figure 2:
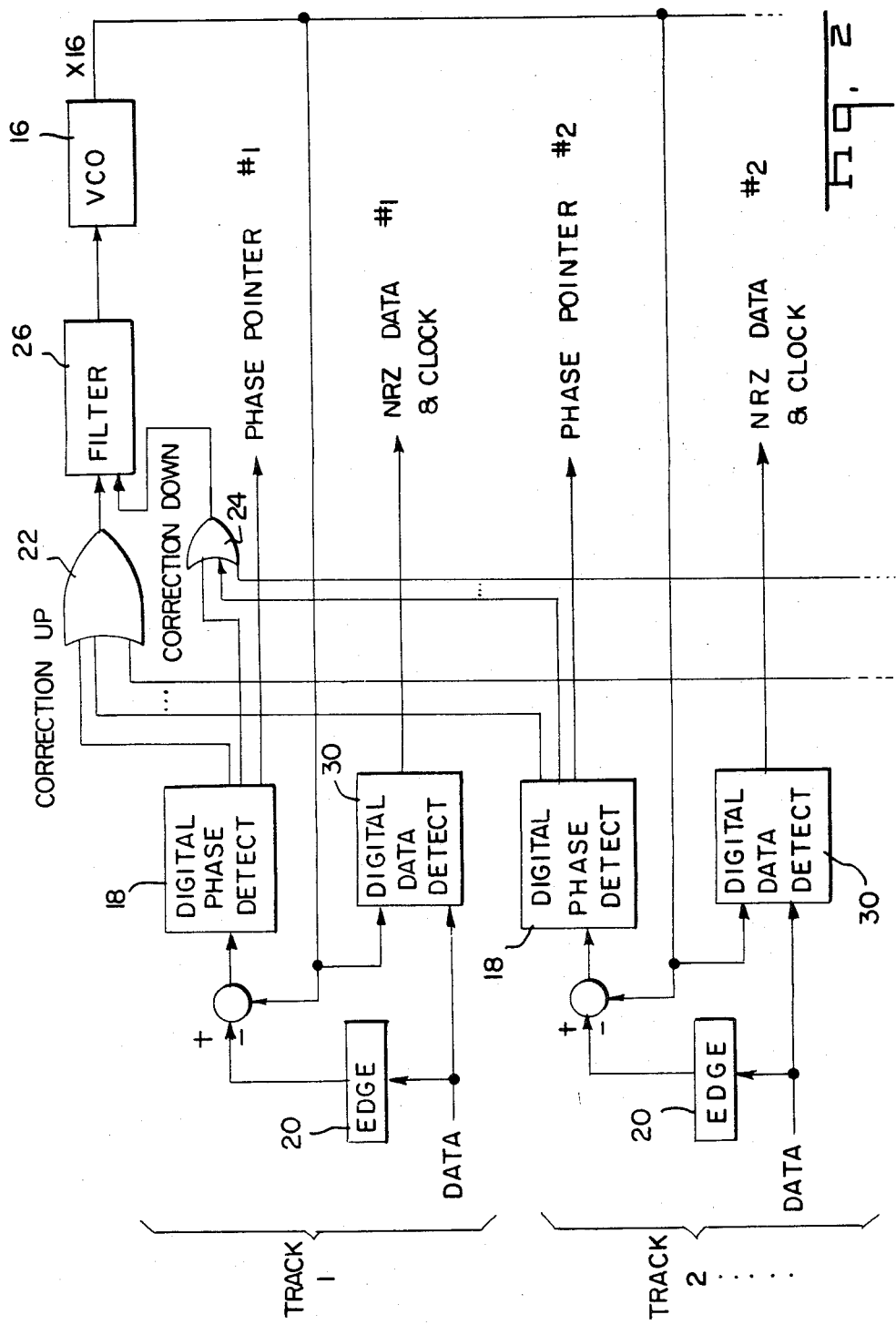
FIG. 2 depicts the data clocking and detection system of the present invention.
Figure 7:
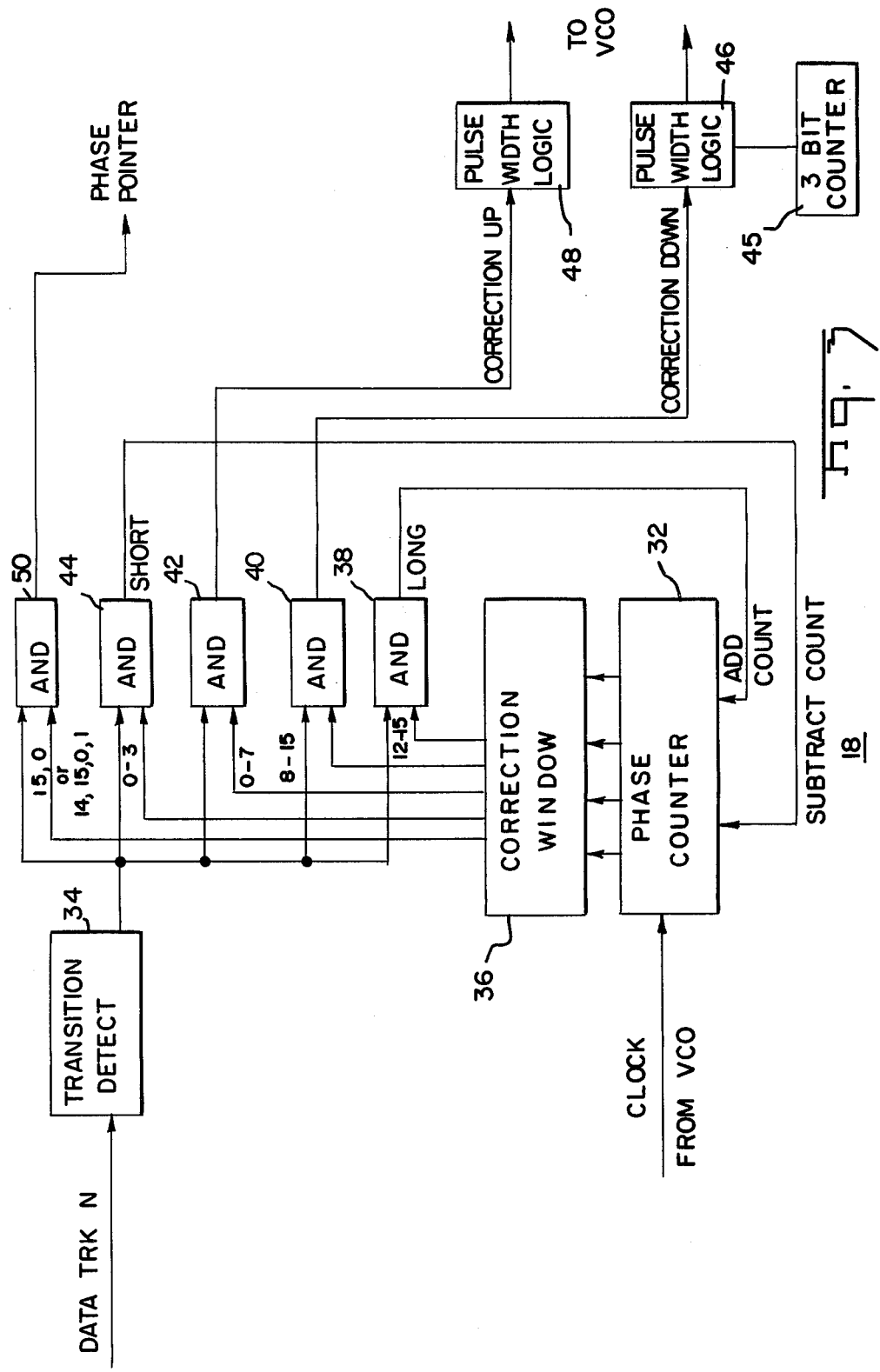

In accordance with the present invention shown in FIG. 2, a common controlled oscillator 16 produces clock pulses for the phase detectors 18 for all nine tracks. The played back tracks of data are applied to edge detectors 20 which detect the transitions representing data. If these transitions occur, they should occur in the middle of the bit cells. These transitions and the clock pulses from the VCO 16 are applied to the phase detector 18 which produces a correction output representing the phase error of the transition with respect to the clock pulses defining the bit cells. If the transition occurs early, before the center of the bit cell, a CORRECTION UP output is produced; if the transition occurs late, after the middle of the bit cell, a CORRECTION DOWN output is produced. The correction outputs of the phase detectors are combined in the OR gates 22 and 24. All nine of the correction up signals are combined in OR gate 22 to produce a signal which is filtered in filter 26, and applied to VCO 16 to increase the frequency. All nine of the CORRECTION DOWN outputs are combined in OR gate 24, the output of which is filtered in filter 26 to produce a voltage which is applied to VCO 16 to decrease the frequency of the clock pulses.

These clock pulses, together with played back data, are applied to digital data detect circuits 30 which produce outputs representing played back data in nonreturn to zero form, together with clock pulses synchronized with the played back data. The digital data detectors of the present invention also produce phase pointers which are bits accompanying the data and which identify suspect data. These phase pointers indicate data represented by transitions occurring extremely early or late in the bit cell. These phase pointers are used in error correction circuitry commonly associated with magnetic tape storage systems.

The VCO 16 of the present invention produces a prescribed number of clock pulses for each bit cell. In the example there are nominally 16 clock pulses, designated 0-15, for each bit cell, as is depicted in FIG. 6A.

FIG. 3 shows the phase detector circuit 18 which is replicated for each of the nine tracks. It includes a digital phase counter 32 which counts clock pulses from the VCO. Counter 32 normally rolls over and restarts from zero upon counting the 16 clock pulses which define a bit cell.

The played back data from the associated track is applied to the transition detector 34 which produces pulses at the detected transitions. Decoding logic including window generator 36 and AND gates 38-44 produce CORRECTION UP and CORRECTION DOWN signals, and SHORT and LONG signals. These signals are produced in accordance with the time range in which the transition occurs with respect to the center of the bit cell. Referring again to FIG. 6A, a SHORT pulse is produced if the transition occurs during an extreme low range corresponding with counts 0-3. A CORRECTION UP signal is produced if the transition occurs during a range corresponding with counts 0-7; a CORRECTION DOWN output is produced if the transition occurs during a range corresponding with counts 8-15; and a LONG pulse is produced if the transition occurs during an extreme high range corresponding with counts 12-15.

Referring back to FIG. 3, the SHORT pulse is produced by AND gate 44 which responds to an output of window circuit 36 which is up during counts 0-3. The CORRECTION UP output is produced by AND gate 42 which responds to a window which is up during counts 0-7; AND gate 40 produces the CORRECTION DOWN signal in response to the window which is up during counts 8-15; and AND gate 38 produces the LONG signal in response to the window which is up during counts 12-15.

In order to produce CORRECTION UP and CORRECTION DOWN signals having a width proportional to the phase error, the outputs of AND gates 40 and 42 are applied to pulse width logic 46 and 48, respectively. Logic 46 and 48 produce pulses having widths proportional to the time between the transition and the center of the bit cell. Logic 48 produces a pulse that starts at the data edge and stops in the middle of the cell. Counter 45 counts how long after mid-cell a transition occurs. If this late transition occurs, logic 46 produces a pulse proportional to the count in 45.

The CORRECTION UP and the CORRECTION DOWN signals are applied to the OR gates 22 and 24 (FIG. 2) to be combined with other CORRECTION UP and CORRECTION DOWN signals to control the VCO. In this manner, the frequency of the VCO is controlled by the phase errors.

For larger phase errors, counts are added to or subtracted from the phase counter 32. When AND gate 44 produces a SHORT pulse, a count is subtracted from phase counter 32. When AND gate 38 produces a LONG pulse, a count is added to the phase counter 32. This has the effect of advancing or retarding the phase detector of one track with respect to another track. This is used to compensate for phase deviations that might be caused by such factors as head or tape skew.

When the transition occurs in a high or low extreme range of the bit cell, an indication is produced that there is an error in this bit of information. AND gate 50 produces a phase pointer when this occurs.

FIG. 4 shows the data detector which is replicated for each of the nine tracks. Data and the output of phase counter 32 (FIG. 3) are applied to the four-bit data integration counter 52. Data detection circuit 54 produces an output indicating a high or low condition of the counter at the end of the bit cell. For GCR data, NRZ data circuit 56 compares the condition at the end of the present bit cell with that of the last bit cell in flip flop 92 to produce an output representing the NRZ data. For PE data, the data cycle circuit 90 keeps track of the two halves of the PE data cell. NRZ data circuit 56 then determines if the integrated data is high or low during the second half of the data cell to produce the NRZ data output. Clock circuit 58 produces a clock output synchronous with the NRZ data output for either data density.

The operation of the data clocking and detection system of the present invention can be better understood from FIGS. 5A-5H and 6A-6G which depict examples of operation. In FIG. 5A the first transition 60 in the data occurs exactly in the middle of the bit cell as defined by the clock in FIG. 5B. There is a perfect lock. The next transition 62 occurs late, after the middle of the bit cell, but within the time defined by counts 8-11 of the phase counter. A CORRECTION DOWN signal, as shown in FIG. 5D, is produced. The next transition 64, is very early. It should have occurred at the time 66 in the middle of the bit cell. A phase error pointer is produced as seen in FIG. 5H. The last transition 68 occurs early with respect to the middle of the bit cell 70. A CORRECTION UP signal is produced as indicated in FIG. 5C. FIG. 5E shows the output of the data integration counter 52 in detecting this data. NRZ data circuit 56 produces the output indicated in FIG. 5F. Clock 58 produces the wave form shown in FIG. 5G which is a clock synchronized with the data. FIG. 5H shows the error pointer produced by the AND gate 50 to indicate the large phase error occasioned by the transition 64.

FIGS. 6A-6G depict the condition of the phase detectors for two tracks wherein one track is skewed with respect to the other. FIG. 6B shows the played back data for one track and FIG. 6C shows the most significant bit of the phase counter 32 for that track. FIG 6E shows played back GCR data for another track and FIG. 6F shows the most significant bit of the phase counter 32 for that track. FIGS. 6D and 6G show the phase counts for the two tracks. Note that the transition 72 occurred so early that a count was deleted, or skipped, in the phase count by having the counter go from 14 to zero at 76, skipping a count of 15. For the other track, the transition 74 occurred so late that a count was added, or duplicated in the phase count at 78 by repeating a count of 12. The result is that the phase counters for the two tracks obtain an increased phase skew, one with respect to the other.

While a particular embodiment of the invention has been shown and described, various modifications are within the true spirit and scope of the invention. The appended claims are, therefore, intended to cover all such modifications.

What is claimed is:

1. A data clocking and detection system for a digital data storage system in which digital data represented by transitions within successive bit cells are stored and played back in multiple tracks comprising:

a phase detector for each of said multiple tracks, each phase detector producing a correction output representing the phase error of the transitions in the associated track with respect to clock pulses which define said bit cells;

a data detector for each of said multiple tracks, each data detector being responsive to the played back transitions and to said clock pulses to produce signals representing said digital data;

a common controlled oscillator for said multiple tracks producing clock pulses applied to the phase detector and data detector for each of said multiple tracks; and means for combining the correction outputs of said phase detectors to produce a control signal applied to said controlled oscillator to change the frequency of said clock pulses in accordance with the phase error of the transitions in said multiple tracks with respect to said bit cells.

2. The clocking and detection system recited in claim 1 wherein said controlled oscillator produces a prescribed number of clock pulses for each bit cell, each phase detector comprising:

a digital phase counter for counting said clock pulses said counter being normally rolled over upon counting the prescribed number of clock pulses for a bit cell.

3. The clocking and detection system recited in claim 2 wherein said phase detector produces a correction up output when the transition in said played back data occurs in one half of the count of said clock pulses and produces a correction down output when the transition occurs in the other half of said count.

4. The data clocking and detection system recited in claim 3 further comprising:

means connected to the outputs of said phase counter producing short/long signals for large phase errors of said transitions, said short/long signals being applied to said counter to subtract/add counts to said phase counter.

5. The data clocking and detection system recited in claim 3 further comprising:

decoding logic connected to the binary outputs of said phase counter, decoding logic producing a short pulse when the transition in said data occurs when the count in said counter is in an extreme low range prior to the middle of said bit cell, said decoding logic producing a long pulse when the transition in said data occurs when the count in said counter is in an extreme high range after the middle of said bit cell, said short pulse being applied to said counter to subtract from said phase count, said long pulse being applied to said phase counter to add to said phase count.

6. The data clocking and detection system recited in claim 3 further comprising:
   phase correction logic connected to the binary outputs of said preset counter, said phase correction logic producing a correction up output when the transition in said data occurs when the count in said counter is in a low range prior to the middle of said bit cell, said phase correction logic producing a correction down output when the transition in said data occurs when the count in said counter is in a high range after the middle of said bit cell.

7. The data clocking and detection system recited in claim 1 wherein said means for combining comprises:
   an OR gate, the correction outputs from the data detectors being applied to said OR gate; and
   a filter, the output of said OR gate being applied to said filter, the output of said filter being applied to control said controlled oscillator.

8. The data clocking and detection system recited in claim 1 wherein said phase detector produces a correction down output which is a pulse having a width proportional to the phase error of said transitions.

9. The data clocking and detection system recited in claim 1 wherein said data detector includes an integration counter, said clock pulses being applied to said counter and said played back transitions being applied to said counter to produce a digital signal representing said data.

10. The data clocking and detection system recited in claim 1 further comprising:
    transition error detection circuitry responsive to the transitions in said data and to the binary counts in said phase counter to produce an error pointer signal when the transition in said data occurs when the count in said counter is in a low range or in a high range indicating large phase errors.

11. A data clocking and detection system for a digital data storage system in which digital data represented by transitions within successive bit cells are stored on and played back from a reproducible media comprising:
    a phase detector producing a correction output having a pulse width representing the magnitude of the phase error of the transitions with respect to clock pulses which define said bit cells; and
    a controlled oscillator producing clock pulses applied to said phase detector, the correction output of said phase detector being applied to said controlled oscillator to control the frequency of said oscillator in accordance with the magnitude of said phase error as represented by the width of said correction output pulses.

12. The data clocking and detecting system recited in 11 wherein said phase detector includes:
    a digital counter for counting a plurality of clock pulses during the time duration of each bit cell, and
    decoding logic connected to the binary outputs of said counter and producing said correction output having a width proportional to the number of counts by which said transitions differ from the middle of the bit cells.

13. A data clocking and detection system for a digital data storage system in which digital data represented by transitions within successive bit cells are stored on and played back from a reproducible medium comprising:
    a digital counter counting a plurality of clock pulses for each of said bit cells;
    a phase detector responsive to the outputs of said counter and producing outputs representing the phase error of the transitions with respect to clock pulses which define said bit cells;
    a controlled oscillator producing said clock pulses; and
    logic means connected to said phase detector for controlling said oscillator in response to phase errors and for subtracting/adding counts to said phase counter when said phase error is relatively large.

14. The data clocking and detection system recited in claim 11 wherein said controlled oscillator is a common oscillator for multiple tracks of data played back from said reproducible media, and wherein a phase detector is provided for each track.

15. The data clocking and detection system recited in claim 14, said system further comprising:
    means for combining the correction outputs of said phase detectors to produce a control signal applied to said control oscillator to change the frequency of said clock pulses in accordance with the phase error of the transitions in said multiple tracks with respect to said bit cells.

* * * * *